Feb. 17, 1953 J. R. KILGORE 2,629,026
MUTING SYSTEM FOR SIGNAL AMPLIFIERS
Filed May 28, 1949
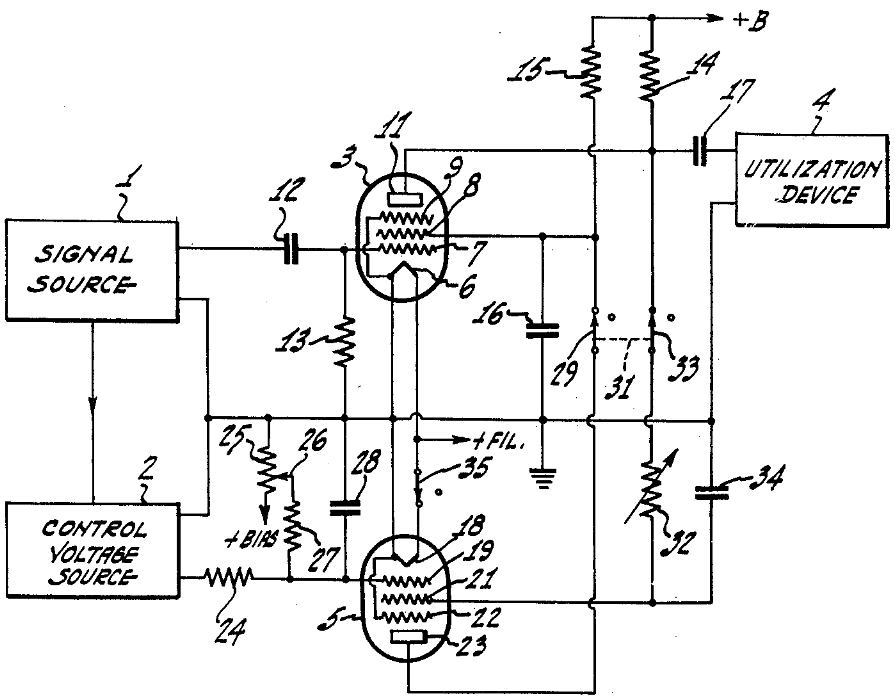
Inventor
JOSEPH R. KILGORE
By H. L. Newton
Attorney Patented Feb. 17, 1953 2,629,026

UNITED STATES PATENT OFFICE 2,629,026

MUTING SYSTEM FOR SIGNAL AMPLIFIERS

Joseph R. Kilgore, Camden, N. J., assignor to Radio Corporation of America, a corporation of Delaware Application May 28, 1949, Serial No. 96,032

7 Claims. (Cl. 179—171)

This invention relates to signal amplifying systems, and has particular reference to control means for use in such systems by which to render them unresponsive to signals impressed thereon having less than a predetermined amplitude.

In signal amplifying systems for use in radio receivers and the like, it is desirable to effect appreciable amplification and faithful reproduction of the received signal effects, and yet at the same time to minimize the amplification and reproduction of noise effects which may be interspersed with the signal effects, particularly when the signal effects are of relatively small amplitudes. Ordinarily, conditions where the signal effects are of relatively small amplitudes, so that the signal-to-noise ratio is small, are encountered when the radio receiver is being tuned from one signal-modulated carrier frequency to another. In the case where the receiver is tuned to a frequency which is intermediate of the frequencies of two adjacent signalling channels, the fact that the received signal energy has a minimum amplitude causes the receiver's automatic gain control facilities to function so as to increase the sensitivity of the receiver by automatically increasing the gain of the signal amplifiers embodied therein. The noise effects which are impressed upon the receiver are, therefore, amplified disproportionately, so that they are reproduced at a relatively high volume by the signal-to-sound transducer.

Operation of a radio receiver in this manner produces undesired sound effects. Accordingly, there have previously been proposed numerous muting systems for disabling some of the signal amplifiers so as to render them unresponsive to any noise effects which may predominate in amplitude over the signal effects received, for example, while the receiver is being tuned from one channel to another. Most of these prior art systems, however, have not been entirely satisfactory, principally for two reasons.

In the first place, they are too slow in rendering the signal amplifiers inoperative once the muting action is initiated. In other words, these prior art systems have not been effective to render the signal amplifiers substantially instantaneously either completely responsive or completely unresponsive to voltages impressed thereon. As a result, while the amplifier is still partially responsive to the voltages impressed thereon, the noise effects which it is desired to suppress are amplified and converted into sound of considerable volume by virtue of the operation of the automatic gain controlling facilities.

In the second place, the action of these prior art muting systems is not positive and invariable. The muting of the signal amplifier in most of these systems may be initiated in response to a signal of one amplitude and may be terminated in response to a signal of a quite different amplitude. As a result, if the system is adjusted to initiate the muting action at the amplitude level of the noise effects when the signal is decreasing in amplitude, as when the receiver is being tuned away from one signal channel, the muting action may be terminated in response to a signal of increasing amplitude, as when the receiver is being tuned to another signal channel, either at a point below the noise level or at a point unnecessarily above the noise level. In one case, the noise effects are reproduced by the receiver and, in the other case, the operative reconditioning of the amplifier is unnecessarily delayed.

The optimum operation of a muting system for a signal amplifier is such that the operativeness or inoperativeness of the amplifier is effected substantially instantaneously and invariably at the same amplitude level irrespective of whether the amplifier is being operatively or inoperatively conditioned. These desirable attributes of a muting control system for a signal amplifier have not been provided by any of the prior art systems.

Accordingly, it is the principal object of the present invention to provide a muting control system for a signal amplifier which will sharply control the amplifier in such a manner as to render it completely unresponsive to all voltages having less than a predetermined amplitude and completely responsive to all voltages having greater than the predetermined amplitude.

Another object of the invention is to provide a muting control system for a signal amplifier which is substantially instantaneous and invariable in its response to a voltage of predetermined amplitude irrespective of the sense in which the voltage impressed upon the amplifier may be varying.

Still another object of the invention is to provide, in a muting control system for a signal amplifier, a simple facility for readily adjusting the amplitude level at which the amplifier is rendered either responsive or unresponsive to voltages impressed thereon, depending on whether or not these voltages have amplitudes which are greater or less than the predetermined amplitude for which the adjustment is made.

In accordance with the present invention, there is provided a muting control system for a signal amplifier which includes a signal amplifying electronic tube and a muting electronic tube. Each of these tubes is provided with at least one electrode controlling the flow of space current therein and a space current conducting electrode. Also, there is provided means for supplying space current to the tubes and which includes facilities for developing voltages at the current conducting electrodes of the respective tubes varying in magnitude in response to amplitude variations of the space currents conducted in the respective tubes. Additionally, in accordance with an important feature of the invention, there is provided means for conductively cross-connecting the current conducting electrodes of each of the tubes to the current controlling electrodes of the other of the tubes, whereby space current conduction in the muting tube completely prevents space current conduction in the amplifying tube, and space current conduction in the amplifying tube tends to prevent space current conduction in the muting tube. Space current conduction in the muting tube is effected under the control of means representative of signals of less than a predetermined amplitude. Finally, there is provided means representative of signals of greater than the predetermined amplitude for interrupting space current conductivity of the muting tube, whereby the amplifying tube is rendered completely unresponsive to signals of less than said predetermined amplitude and is rendered completely responsive to signals of greater than said predetermined amplitude.

More specifically, in accordance with a preferred embodiment of the invention, the space current controlling electrodes are screen grids and the space current conducting electrodes are anodic plate elements. In addition, each of the tubes is provided with another space current controlling grid electrode. The additional grid of the amplifying tube is coupled to a signal source and the additional grid of the muting tube is coupled to a control voltage source the amplitude of which preferably varies in accordance with signal amplitudes. The space current supplying means for the tubes include impedance devices, such as resistors, connected respectively to the plates or anodes of the tubes. Also, there may be included a series resistor in the cross-connection from the anode of the amplifying tube to the screen grid of the muting tube, for the purpose of determining the timing of the operation of the muting tube to control the operation of the amplifying tube. The additional resistor may be made adjustable so as to permit variation of the difference in the signal levels at which the muting tube is rendered conducting and nonconducting.

The novel features that are considered characteristic of this invention are set forth with particularity in the appended claims. The invention itself, however, both as to its organization and method of operation, as well as additional objects and advantages thereof, will best be understood from the following description taken in connection with the accompanying drawing.

The single figure of the accompanying drawing is a circuit diagram illustrating an embodiment of the invention in conjunction with an audio frequency amplifier.

Having reference now to the drawing, there is shown a signal source 1 which, in the case where the invention is embodied in a radio receiver, may be the output circuit of the signal detector. Also, there is shown a control voltage source 2 which, as indicated, may be coupled to the signal source. For example, the control voltage source may be coupled directly to the load circuit of the signal source in which the signal voltages to be amplified are developed. Alternatively, the control voltage source may be coupled to the automatic gain control system usually associated with a signal source of the character described. The signal amplifying stage illustrated in the drawing includes a signal amplifying electronic tube 3, which preferably is a pentode having a relatively high amplification factor. One such tube which has been used successfully is the 1S5. The signals which are amplified by the tube 3 are impressed upon any suitable utilization circuit or device 4 which, for example, may be a power amplifying stage. The operation of the tube 3 is controlled, in accordance with the present invention, by suitable operation of a muting electronic tube 5, which also preferably is a pentode having a sharp cut-off characteristic, such as a CK-5678.

More specifically, the signal amplifying stage which is to be controlled in accordance with the present invention is one in which the signal amplifying electronic tube 3 is provided with a cathode 6 which, in the disclosed form of the invention, is a filamentary type; but, as will be obvious to those skilled in the art, an indirectly heated cathode may be employed with equal facility. The tube 3 is provided with a control grid 7, a screen grid 8, a suppressor grid 9, and an anode 11. The suppressor grid 9 is conventionally connected to the grounded cathode 6. The control grid 7 is coupled to the signal source 1 by a capacitor 12, with which is associated a resistor 13 providing a grid return or leak to ground. Space current for the tube 3 is provided from a conventional source of unidirectional energy indicated at +B, by means of a load resistor 14 coupled to the anode 11. A positive potential is impressed upon the screen grid 8 by means of a resistor 15, which also may be connected to the unidirectional voltage source +B. A capacitor 16, connected to the screen grid, provides a signal frequency bypass to ground. The output circuit of the tube 3, which includes the anode 11, is coupled by a capacitor 17 to the utilization device 4.

The muting electronic tube 5 comprises a cathode 18 which may be of the filamentary type as shown, or an indirectly heated type if desired, a control grid 19, a screen grid 21, a suppressor grid 22, and an anode 23. Again conventionally, the suppressor grid may be connected to the cathode as shown. The control grid 19 is coupled by a resistor 24 to the control voltage source 2 in such a manner that the control voltages impressed thereon are of negative polarity relative to the grounded cathode 18. There also is provided, for a purpose to be described, a positive biasing system for the control grid 19. This system consists of a potentiometer 25 coupled between a positive voltage source, indicated as +Bias, and ground. This positive voltage source may, if desired, be the same unidirectional voltage source used for the supply of space current to the tubes and indicated as +B. In order to adjustably control the positive biasing voltage impressed upon the control grid 19 of the tube 5, the sliding contact 26 of the potentiometer is connected by a current limiting resistor 27 to the control grid. This grid also is bypassed to ground for current of signal frequency by a capacitor 28. Space current for the tube is supplied by a circuit extending from the anode 23, through one contactor 29 of a two-pole double-throw switch 31 and the resistor 15, to the undirectional voltage source +B. A positive potential is impressed upon the screen grid 21 of the tube 5 by means of a circuit including a resistor 32, which preferably is adjustable as shown, a second contactor 33 of the switch 31, and the resistor 14, to the unidirectional voltage source +B. The screen grid also is bypassed to ground for signal frequency voltages by a capacitor 34.

The filamentary cathodes 6 and 18 of the tubes 3 and 5, respectively, are energized by a circuit extending to a suitable voltage source, indicated as +Fil. Also, in accordance with a preferred embodiment of the invention, the energizing circuit for the cathode 18 of the tube 5 includes a single-pole, double-throw switch 35.

Having reference now to the operation of the illustrated embodiment of the invention, it will be assumed that, initially, the signals derived from the source 1 are of relatively small amplitude and of such a character that it is not desired to amplify them for subsequent conversion into sound effects. In order to render the signal amplifying tube 3 unresponsive to any voltages impressed upon the control grid thereof from the signal source 1, the sliding contact 26 of the potentiometer 25 is adjusted to impress a positive potential upon the control grid 19 of the tube 5, of suitable magnitude to render this tube conductive until a signal voltage of predetermined magnitude is developed in the output circuit of the source 1. With the tube 5 in a conducting state, anode current traverses the resistor 15, thereby developing a substantial voltage drop in this resistor, which results in the impression upon the screen grid 8 of the tube 3 of a positive voltage of insufficient magnitude to permit this tube to conduct space current. At the same time, the current drawn by the screen grid 21 of the muting tube 5, in traversing resistor 14, effects the impression upon the anode 11 of the tube 3 of a reduced positive voltage. Accordingly, it is seen that, so long as the muting tube 5 is in a conducting state, the amplifying tube 3 is cut off so as to render it completely unresponsive to any signal or other voltage impressed upon the control grid 7 thereof from the signal source 1.

Now, assume that the amplitude of the signals developed by the source 1 increases to a value in excess of the predetermined amplitude at which it is desired to render the amplifying tube 3 operative. A voltage of increased magnitude is developed by the control voltage source and is impressed in negative polarity upon the control grid 19 of the muting tube 5, in opposition to the positive biasing voltage impressed upon this tube by the potentiometer 25. It will be understood that the net effective voltage impressed upon the control grid 19 of the muting tube 5 is sufficiently negative to initiate the cut-off of space current conduction in this tube. As a result of this operation, the anode current for the tube 5, which traverses resistor 15, is reduced in magnitude suitably to effectively increase the positive potential impressed upon the screen grid 8 of the amplifying tube 3, thereby rendering this tube operative for response to the signal voltages impressed upon the control grid 7 thereof. Space current flowing in this tube incidental to the signal amplifying operation thereof, in traversing the load resistor 14, is of considerably greater magnitude than the current flowing in this resistor to the screen grid 21 of the muting tube 5. As a consequence, the positive voltage which is impressed upon the screen grid 21 of the muting tube 5 is considerably reduced in magnitude, thereby hastening the cut-off of space current in the muting tube. Thus, it is seen that, once the magnitude of the space current flowing in the tube 5 is reduced under the initial control of the grid 19 to a point where space current is permitted to flow in the amplifying tube 3, the action of this latter tube accelerates the cut-off of space current in the tube 5 under the additional control of the screen grid 21. By this means, the amplifying tube is substantially instantaneously rendered completely responsive to signal voltages of greater than a predetermined amplitude.

So long as the amplitude of the signals derived from the source 1 remains greater than the predetermined amplitude for which the biasing potentiometer 25 is adjusted, the amplifying tube 3 functions in a normal manner. However, as soon as the amplitude of the signals derived from the source 1 decreases below the predetermined amplitude, the control grid 19 of the muting tube 5 initiates the flow of space current in this tube. The resulting current to the anode 23 of the muting tube, in traversing the resistor 15, again decreases the positive potential impressed upon the screen grid 8 of the amplifying tube 3, thereby initiating the cut-off of space current in this tube. Any substantial decrease in the space current of the tube 3 increases the positive voltage across the resistor 14 which is impressed upon the screen grid 21 of the muting tube 5, thereby accelerating the flow of space current in this tube. The accelerated space current flow in the tube 5 further decreases the potential of the screen grid 8 of the tube 3, with the result that the amplifying tube is substantially instantaneously rendered completely unresponsive to voltages of less than the predetermined amplitude.

It will be appreciated that the ideal operating characteristic of any system of the character described is that the muting tube be rendered either conducting or non-conducting in response to substantially the same amplitude of control voltage. As a practical matter, however, such type of operation is not completely realizable. For example, in the embodiment of the invention illustrated and described herein, the muting tube 5 is rendered non-conducting in response to a control voltage impressed upon the grid 19 thereof which is of somewhat greater negative amplitude than the control voltage which is required to render the tube conducting. Consequently, it is necessary to minimize this control voltage differential in most cases for satisfactory muting of the amplifying tube 3. However, in a case where it may be desirable to control the operation of an amplifying tube in such a manner that it will be rendered responsive to signals impressed thereon at two different signal levels, depending upon whether the signal amplitude is increasing or decreasing, the resistor 32 may be adjusted to a suitable value to effect the desired control voltage differential.

In order that any instantaneous current decreases in the amplifying tube 3 be ineffective to impress a positive potential upon the screen grid 21 of the muting tube 5, of a sufficient magnitude which would tend to condition the muting tube for space current conduction, the resistor 32 and the capacitor 34 function as an audio frequency filter. By such means, the voltage which is impressed upon the screen grid 21 of the muting tube does not vary in accordance with the instantaneous signal amplitude, but instead, varies only in accordance with the average signal amplitude. Such a facility is a desirable one, particularly in a case where the control voltage for the grid 19 of the muting tube 5 is derived directly from the signal detector. For such a case, there is a tendency for the grid 19 to render the muting tube operative in response to instantaneous signal voltages of less than the predetermined amplitude. As an added precaution against this tendency, the grid 19 may be bypassed to ground at signal frequencies by capacitor 28.

If desired, this muting system may be provided with facilities whereby it may be selectively rendered effective or ineffective. This facility is provided by means of switches 31 and 35, the operation of either one or both of which to the respectively idle contacts thereof will render the muting tube 5 and its associated apparatus ineffective as a controlling means for the amplifying tube 3, which then functions in the normal manner of a signal amplifying stage. Obviously, if the switch 35 is actuated to its inoperative position, the cathode 18 will not be heated and the tube 5 will not function as a consequence thereof. Also, if the switch 35 is maintained in its operative position, as shown, and the switch 31 is actuated to its inoperative position, there will be no flow of anode or screen grid current in the tube 5, whereby the potentials impressed upon the screen grid and anode of the tube 3 will not be affected. As a practical expedient, however, it is preferred to deactivate the muting system by actuating the switch 31 to its inoperative position and to position the switch 35 in its operative condition as shown. In this way the cathode 18 always will be in a completely heated state, whereby to effect the emission of a maximum number of electrons, so that a subsequent operation of the switch 35 to its operative position, as shown, will immediately effect the full operation of the muting system.

It, thus, will be seen that a muting system for a signal amplifier, as provided by the instant invention, is effective to positively control the operation of the signal amplifier so that it is entirely unresponsive to all signals below a predetermined amplitude, and is completely responsive to all signals above the predetermined amplitude. Furthermore, by reason of the described cross-connections between the anodes and screen grids of the tubes 3 and 5, the operation of the muting system is substantially instantaneous irrespective of whether it is functioning to initiate or to terminate the conduction of space current in the amplifying tube 3.

It is to be noted that the muting system in accordance with the present invention is particularly well suited for use in conjunction with electron tubes which are provided with filamentary type cathodes. It is necessary, when using tubes of this type, to operate the cathodes at ground potential. Consequently, it is not possible to advantageously employ any of the usual biasing facilities in conjunction with the muting tube, such as bypassed cathode resistors and the like.

However, it is not intended to restrict the use of the present invention to tubes having filamentary cathodes. Obviously, the invention may be employed with substantially equal facility in conjunction with tubes having indirectly heated cathodes.

It will be appreciated that the present invention may be embodied in systems other than that specifically described herein for illustrative purposes. For example, it obviously is not necessary that the control voltage source 2 be directly coupled to the signal source, or even controlled thereby. The present system is susceptible of embodiment in conjunction with other types of amplifying systems wherein the amplifying tube 3 is to be controlled in accordance with some varying voltage other than that of the signal to be amplified. Accordingly, the scope of the invention is to be determined by reference to the appended claims.

What is claimed is:

1. In a signal amplifying system, a signal amplifying electronic tube and a muting electronic tube, each of said tubes having a cathode electrode, a control electrode, a screen electrode and an anode electrode, means for connecting the control electrode of said signal amplifying tube to a source of variable amplitude signals, circuit means supplying anode-to-cathode current to said tubes to develop voltages at said anode electrodes varying in magnitude in response to amplitude variations of the anode-to-cathode currents in the respective tubes, respective circuit means cross-connecting the anode electrodes of each of said tubes to the screen electrodes of the other of said tubes and effective upon current conduction in either of said tubes to prevent current conduction in the other of said tubes, a source of automatic gain control voltage, a first circuit means coupled between said automatic gain control source and the control electrode of said muting tube effecting upon application thereto of a control voltage having a magnitude and polarity representative of signals of less than a predetermined amplitude space current conduction in said muting tube, and second circuit means coupled to the control electrode of said muting tube effective upon application thereto of a control voltage having a magnitude and polarity representative of signals of greater than said predetermined amplitude the interruption of space current conduction in said muting tube, whereby to render said amplifying tube completely unresponsive to signals of less than said predetermined amplitude and completely responsive to signals of greater than said predetermined amplitude.

2. In a signal amplifying system, the combination as defined in claim 1, in which the current supplying means include impedance devices connected respectively to the anodes of said tubes and serving to develop said varying voltages at said respective anodes.

3. In a signal amplifying system, the combination as defined in claim 2, in which said cross-connection from the anode of said amplifying tube to the screen grid of said muting tube includes an adjustable impedance device.

4. In a signal amplifying system, a source of signals of variable amplitude, a signal amplifying electronic tube having a cathode, an anode, a control grid and a screen grid, means coupling said control grid to said signal source, and a muting system for rendering said amplifying tube unresponsive to signals having less than a predetermined amplitude; said muting system comprising, a source of signal-responsive automatic gain control voltage of negative polarity, a muting electronic tube having a cathode, an anode, a control grid and a screen grid, resistive means coupling the control grid of said muting tube to said automatic gain control voltage source, a source of biasing voltage of positive polarity coupled to the control grid of said muting tube, said automatic gain control voltage source and said biasing voltage source being effective to control the operation of said muting tube so that it is conductive for signals having less than said predetermined amplitude and is non-conductive for signals having more than said predetermined amplitude, a source of space current for said tubes, first resistance means coupling said space current source to the anode of said muting tube and to the screen grid of said amplifier tube, and second resistance means coupling said space current source to the anode of said amplifier tube and to the screen grid of said muting tube, whereby space current conduction and non-conduction by said muting tube renders said amplifying tube unresponsive and responsive, respectively, to signals derived from said signal source.

5. In a signal amplifying system, a source of signals of variable amplitude, a signal amplifying electronic tube having a cathode, an anode, a control grid and a screen grid, means coupling said control grid to said signal source, and a muting system for rendering said amplifying tube unresponsive to signals having less than a predetermined amplitude; said muting system comprising, a source of automatic gain control voltage of negative polarity and variable amplitude, a muting electronic tube having a cathode, an anode, a control grid and a screen grid, means coupling the control grid of said muting tube to said control voltage source, a source of biasing voltage of positive polarity coupled to the control grid of said muting tube, said automatic gain control voltage source and said biasing voltage source being effective to control the operation of said muting tube so that it is conductive for signals having less than said predetermined amplitude and is non-conductive for signals having more than said predetermined amplitude, a source of space current for said tubes, first impedance means coupling said space current source to the anode of said muting tube and to the screen grid of said amplifier tube, and second impedance means coupling said space current source to the anode of said amplifier tube and to the screen grid of said muting tube, whereby space current conduction and non-conduction by said muting tube renders said amplifying tube unresponsive and responsive, respectively, to signals derived from said signal source.

6. In a signal amplifying system, a source of signals of variable amplitude, a signal amplifying electronic tube having a cathode, an anode, a control grid and a screen grid, means coupling said control grid to said signal source, and a muting system for rendering said amplifying tube unresponsive to signals having less than a predetermined amplitude; said muting system comprising, a source of automatic gain control voltage of negative polarity coupled to said signal source, said control voltage varying in amplitude in accordance with said signal amplitude variations, a muting electronic tube having a cathode, an anode, a control grid and a screen grid, means coupling the control grid of said muting tube to said automatic gain control voltage source, a source of biasing voltage of positive polarity coupled to the control grid of said muting tube, said automatic gain control voltage source and said biasing voltage source being effective to control the operation of said muting tube so that it is conductive for signals having less than said predetermined amplitude and is non-conductive for signals having more than said predetermined amplitude, a source of space current for said tubes, means including a first resistor coupling said space current source to the anode of said muting tube and to the screen grid of said amplifier tube, means including a second resistor coupling said space current source to the anode of said amplifier tube, and means including a third resistor and a signal frequency bypass capacitor coupling the anode of said amplifying tube to the screen grid of said muting tube, whereby space current conduction and non-conduction by said muting tube renders said amplifying tube unresponsive and responsive, respectively, to signals derived from said signal source.

7. In a signal amplifying system, a variable gain amplifying stage comprising an electronic amplifying tube having a cathode, an anode and a signal input control grid, a source of variable amplitude signals coupled to said grid, a signal output circuit coupled to said anode and including an anode coupling impedance device, a second electronic tube having a cathode, an anode and a control grid, control voltage means coupled to said signal source for supplying a control voltage by which to vary the gain of said second tube, a series coupling impedance device interposed between said control voltage means and said last named grid, additional control voltage supplying means connected between the grid and cathode of said second tube and applying an adjustable positive biasing voltage to said last named grid, an anode circuit including an anode coupling impedance device connected with said last named anode, each of said tubes having a screen grid interposed in the space path thereof between said control grid and said anode, the screen grid of each tube being connected conductively with the anode of the other tube, whereby conductive operation of said second tube renders said amplifying tube inoperative, said second tube being responsive to adjustment of said positive biasing voltage, whereby said amplifying tube is rendered inoperative for signals of less than a predetermined amplitude determined by the magnitude of said positive biasing voltage and is rendered operative for signals of more than said predetermined amplitude, and utilization means coupled to said signal output circuit.

JOSEPH R. KILGORE.

REFERENCES CITED

The following references are of record in the file of this patent:

UNITED STATES PATENTS

| Number | Name | Date |
|---|---|---|
| 2,271,915 | Belleville | Feb. 3, 1942 |